Sept. 3, 1957    A. I. MIHALAKIS    2,804,801
PROJECTION SCREENS
Filed Nov. 23, 1951    4 Sheets-Sheet 1
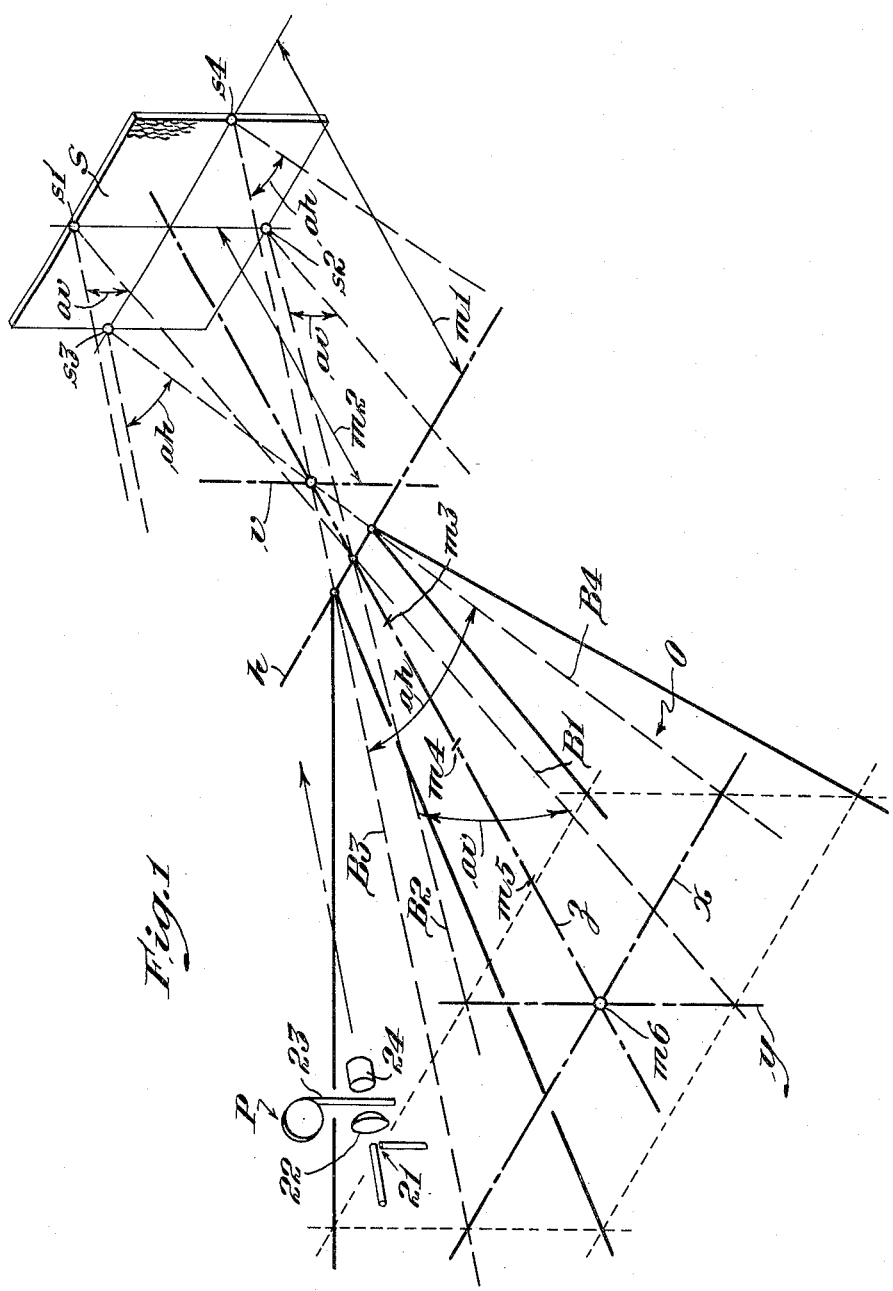
INVENTOR
AGIS I. MIHALAKIS
BY
Bean, Brooks, Buckley & Bean
ATTORNEYS

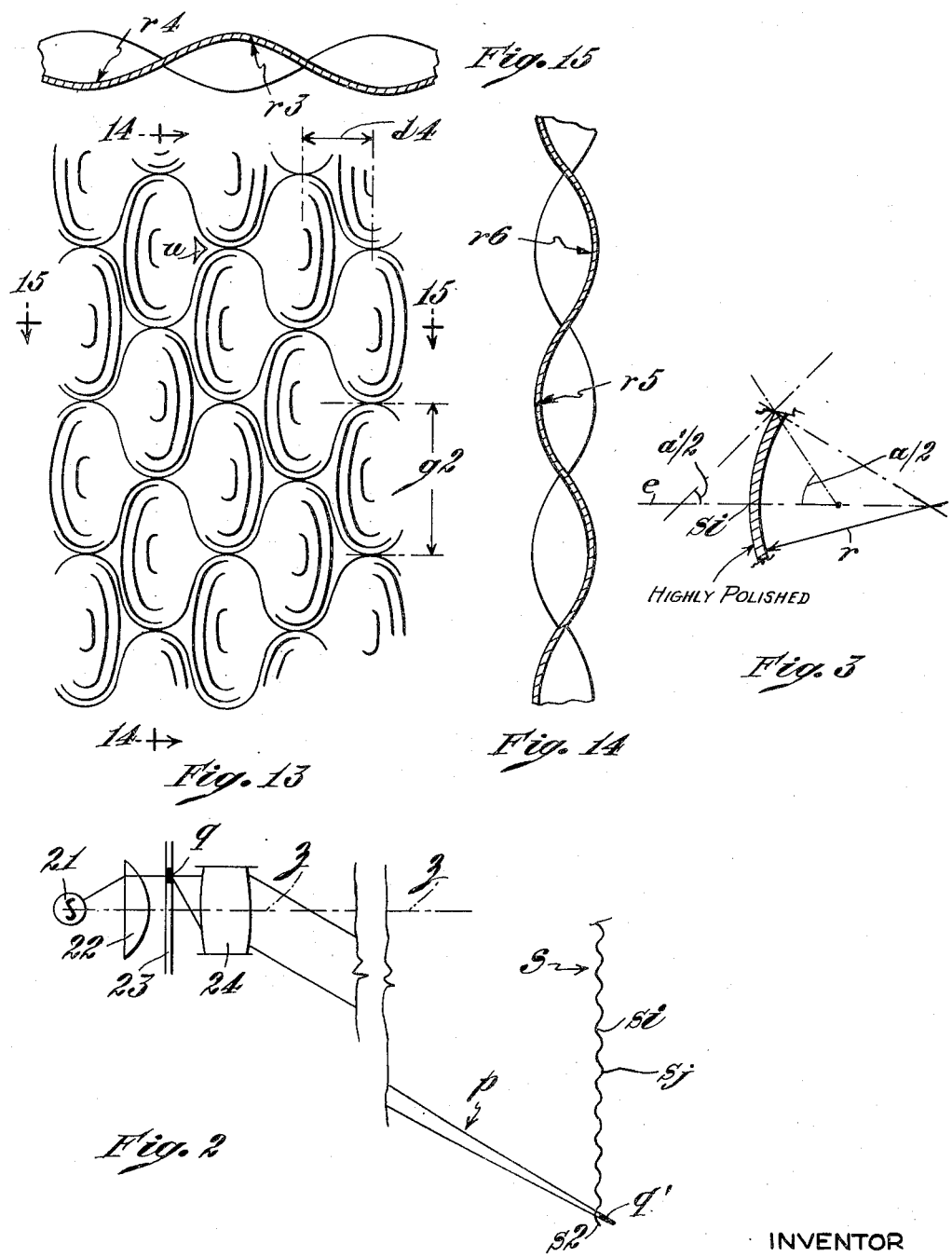

INVENTOR
AGIS I. MIHALAKIS

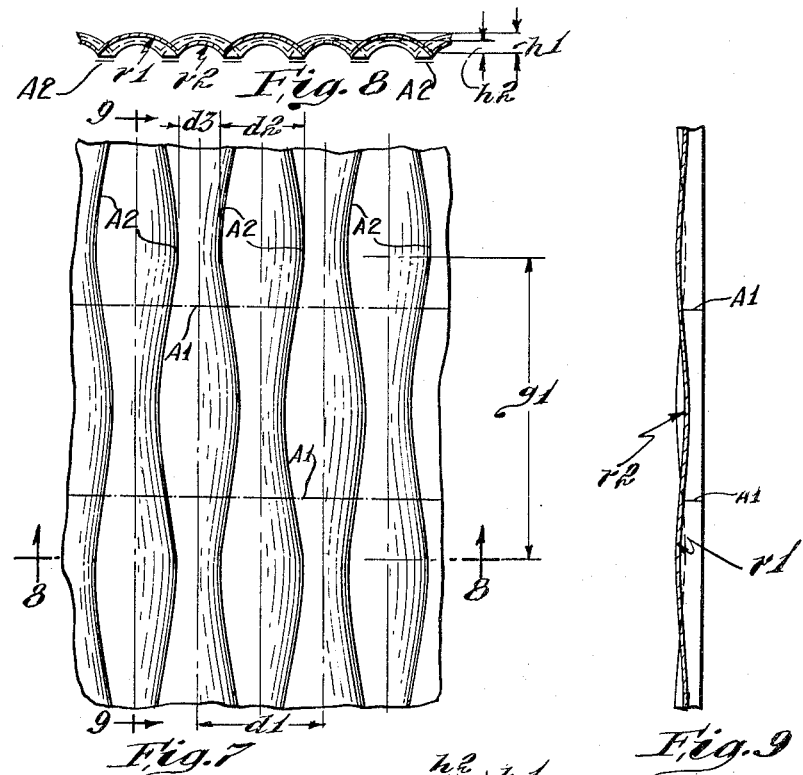
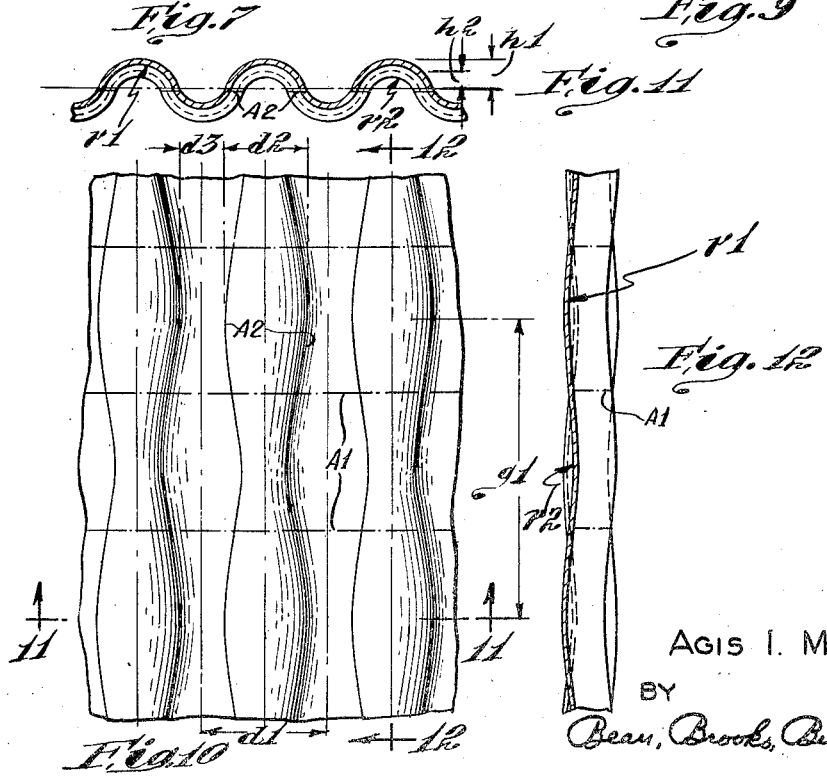

United States Patent Office 2,804,801
Patented Sept. 3, 1957

2,804,801

PROJECTION SCREENS

Agis I. Mihalakis, Buffalo, N. Y., assignor, by mesne assignments, to William T. Snyder, South Lancaster, Mass.

Application November 23, 1951, Serial No. 257,691

14 Claims. (Cl. 88—28.9)

The present invention relates to optical screens of the type suitable to receive an image formed by projection apparatus and to present the image to observers.

While the efficiency of such screens is often of no particular importance especially if, as in conventional motion picture theatres, extraneous light can be substantially excluded and there is little limitation upon the light output of the projection apparatus, there are situations where optimum economy regarding the useful image energy on the one hand and optimum suppression of detrimental effects of non-image light are very important. For example amateur or other portable projection equipment is quite limited as to the output of the light source, and seldom permits complete or even partial exclusion of extraneous light, so that the ratio of image energy available for viewing purposes to the level of extraneous light falling on the screen is, generally speaking, unsatisfactory especially in view of physiological phenomena to which the observers are necessarily subject. This situation prevails also with regard to school or lecturing projector equipment, outdoor motion picture theatres, projection apparatus for scientific or practical measuring purposes, and television devices.

It has heretofore been proposed to improve the efficiency and usefulness of screens of the above type by eliminating light absorption so far as possible and by introducing, instead of uncontrolled diffuse reflection, some sort of controlled reflection, by way of subdividing the screen into small optical elements. Practical experience has shown that, while such screens are to some extent better than strictly diffusing screens, they are not able to increase the actually available image energy reflected from the screen into a given field of observation to such a degree that the level of image intensity available within the field of observation is sufficiently above that of extraneous light directly falling thereinto or reflected from the screen to preserve image contrast sufficient for clear perception. Further, previously proposed screens of this type not only fail for theoretical reasons but require very difficult, impractical and expensive manufacturing techniques, or cannot easily be maintained at top efficiency.

It is one of the primary objects of the present invention to provide a projection screen which not only provides optimum utilization of the available image energy, but utilization of such image energy, even of comparatively low level, under very unfavorable conditions of extraneous, nondesirable light. It will be understood that such extraneous or ambient light, while increasing the intensity level of the projected image, for perceptional purposes does not sufficiently raise the intensity of the highlight portions of the image, thus decreasing the contrast of, and blotting out the projected image. With a sufficiently high image intensity, screens designed according to the present invention remain operative under extremely unfavorable conditions, such as broad daylight falling upon the screen.

Another object of the invention is to provide a screen of the above type which reflects into a given observation field as defined by the lateral and vertical viewing angles, a substantially constant average image intensity, so that the screen retains uniform brilliance over the entire area, whether it is viewed directly in the optical axis of projector and screen system or from a side within the field of observation.

A further object of the invention is to provide projection systems of simple design, and easy manufacture and operation, which permit satisfactory utilization of illumination levels for which conventional devices have proved to be inoperative or requiring cumbersome and expensive arrangements.

A still further object is to provide systems for projecting light from different sources and of different characteristics onto a single screen area which affects separate fields of observation differently, in accordance with the different source characteristics; these characteristics can involve differentiation of color, intensity, or picture pattern, for purposes such as advertising, interior decoration, signalling, producing motion pictures, or television.

Additional objects are to provide such a screen which has substantially no effect upon the spectral characteristics of the light emerging from the projection apparatus, rendering it particularly suitable for purpose of color rendition, to provide such a screen which can be manufactured fairly easily to any required overall dimensions without falsifying the intended configuration of its optically effective elements according to a predetermined pattern and which can be manufactured with essentially conventional tools of dimensions which do not place an unusual burden on the quality of tools and skill of the operator, and which screen will withstand comparatively adverse environmental conditions such as encountered in outdoor motion picture theatres or during military use for troops in the field. Generally speaking it is an object of the invention materially to advance, on the basis of an entirely fresh approach to the inherent problems, the art of providing screens of the above type, from the point of view of the observer as well as the manufacturer.

In accordance with one aspect of my invention, a screen for viewing, from within a field of observation, an image projected on the screen from an object region, comprises a plurality of juxtaposed substantially nondiffusing elementary optical systems either all convex or concave or alternatingly convex and concave, and together forming the total screen surface and being curved such as to present elementary images essentially only to the field of observation, and to direct light incident on the screen from without the field of observation to any point of that field essentially only at intensities which are at that point lower than the intensity directed by the screen to such point from the object.

In another aspect, the elementary surfaces have boundaries constituting stops and curvatures determining image areas such that the relative values of the stops and curvatures define elementary object and image field angles which together admit to a field of observation essentially all light from an object while excluding an essential amount of light incident from without the field of observation. Thus the elementary images effected by the elementary surfaces are presented essentially only to the field of observation while light incident on the screen from without that field is essentially excluded from the field of observation. In accordance with a preferred embodiment of the invention, the elementary optical systems are alternately convex and concave and merge to form a continuously undulated screen surface so that the above-mentioned field angles are at boundary regions where the respective convex and concave curves merge.

A further important feature of the invention is elementary surfaces with double curvature either negative or positive or both, at substantially all points of the screen surface with the exception of the above-mentioned boundary regions.

Another important feature of the invention is the shaping of the elementary optical systems in such a manner that the above-mentioned field angles differ in lateral and vertical directions to conform to a given field of observation with different dimensions in these directions, so that the image light energy available from a given object is directed mainly into that field and a practically minimum amount thereof into space outside thereof, while an essential part of extraneous light, that is light coming from outside the field of observation of such dimensions, is directed into space outside of that field, which has the above-mentioned effect of providing at any point of the field of observation an image intensity which is considerably higher than the intensity that reaches the same point from such extraneous light sources. In this manner the projected image retains under most practical circumstances contrast sufficient for distinct perception regardless of the intensity of extraneous light, whether strong direct or diffuse artificial or daylight. The brilliance of screens according to the invention is under most practical conditions high enough to prevent contrast reduction and hence image deterioration other than coming from the projected object.

In a further more specific aspect, the invention contemplates elementary optical elements of certain dimensions, which have proved to be particularly beneficial and which will specifically be described herein with reference to their actual performance.

While certain features of the present invention relate mainly to observation of the image from the side facing the projector or other object, others apply as well to back projection screens which transmit the image light or other useful light from one surface of the screen to the other, with the field of observation on the opposite side from the object. Such features include the configuration of lens elements which replace the mirror elements of opaque or front projection screens, and the spatial correlation of such elements. In certain instances the optical elements according to the invention will reflect as well as refract light incident thereon, with useful results derived from their peculiar configuration and correlation.

Other objects, aspects, and features, in addition to those contained in the above short statement of the nature and substance including some of the objects of the invention, will appear from the herein presented exposition of its basic theoretical principles so far as they can be ascertained at the present time and from the following description of several typical embodiments thereof illustrating its novel characteristics. This description refers to drawings in which Fig. 1 is an axonometric diagram of a screen in the environment which determines its structure according to the invention, this figure serving also the purpose of illustrating certain concepts and terms used herein, and further of facilitating a description of the practical performance of an actual embodiment of the invention;

Fig. 2 is a diagrammatical median section on axes $y$ and $z$ of Fig. 1;

Fig. 3 is a diagram indicating the first-order theory of the field angles and stops of mirrors of the type herein employed;

Figs. 7 to 9 illustrate the actual configuration of a practical embodiment of a screen according to the invention, in plan view and sections on lines 8—8 and 9—9 respectively;

Figs. 10 to 12 are showings similar to Figs. 7 to 9, of a second embodiment;

Figs. 13 to 15 are showings similar to Figs. 7 and 13 of a third embodiment of the invention.

Figure 16:
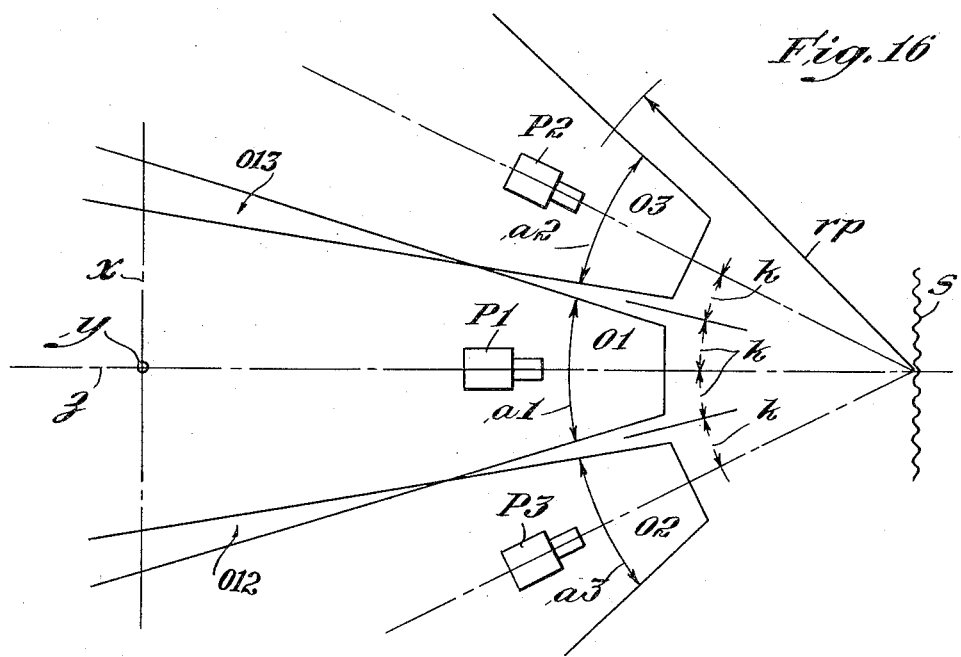
Fig. 16 is a diagrammatic median section on axes $y$—$z$ of Fig. 1, illustrating an embodiment of the invention wherein three images are simultaneously projected.

Figs. 1 to 3 show a screen S of conventional overall dimensions arranged for projection thereon of an image produced by conventional projection apparatus P comprising a light source 21, a condenser 22, a diapositive such as a film strip 23, and a projector lens system 24. It will be understood that the projector as a whole or the diapositive 23 defines an object region containing in this embodiment as an object the diapositive which can be considered to consist of object elements $q$ (Fig. 2) that are by the lens system 24 imaged on corresponding elementary areas $q'$ of screen S which are defined by elementary optical systems $s$, such as the curved mirrors indicated in Figs. 2 and 3.

The horizontal object field angles $ah$ and the vertical object field angles $av$ of the respective outermost screen elements $s1$, $s2$, $s3$, $s4$ define, in the manner clearly indicated in Fig. 1, a field of observation O which extends rearwardly to any desired extent such as determined by environmental conditions. In Fig. 1 a possible rear boundary is indicated by axes $x$ and $y$ which are normal to the axis $z$ of screen S and field of observation O. The latter is further delimited by the line $h$ at the intersection of the inner field angle lines originating at $s1$ and $s2$, by an upper and a lower border plane B2 and B1 respectively, intersecting at $h$ and right and left hand border planes B3, B4 respectively, which intersect at $v$. The significance of the field angles in this context will be further explained hereinbelow. Generally speaking, space is thus divided, for purposes of the present description, into an object region P, a screen region S which is subdivided into elementary screen regions $q'$ corresponding to object elements $q$, a field of observation O, and the remaining extraneous field which, however, may contain additional fields of observation as will be explained hereinbelow. The angles $ah$ and $av$ indicated at the screen also occur in the field of observation and are accordingly indicated in Fig. 1. In order to simplify this description, Fig. 1 shows screen region and observation field as symmetrical to planes defined by main axes $x$, $y$, and $z$, but it will be understood that the axes can be inclined and the field unsymmetrical.

Fig. 2 shows, in a simplified cross section through part of screen S, by way of example convex and concave elementary mirrors $si$ and $sj$ which together constitute a continuously undulated screen surface. Optically speaking, convex and concave elements are equivalent for purposes of the invention, as will further appear from the following discussion. While alternately convex and concave elements offer important advantages in accordance with one of the aspects of the invention, other features of the invention can be accomplished with only convex or only concave elements otherwise constructed and arranged according to the invention.

The screen S can be made of suitable sheet metal such as brass or steel. Optically less desirable metal screens can be coated, if desirable, with another metal as for example nickel, chromium, aluminum or silver. The screen body can be made with essentially equidistant front and rear surfaces, or it can be solid with a flat rear surface. The screen can also be made of dielectric material such as polymerized plastic compounds shaped in accordance with the invention and coated with a metal layer applied to the reflecting layer. A protective layer of suitable optical properties can be applied over such coating. Such a protective layer is sometimes also desirable in the case of solid metal screens. In every case, the optically effective surface must be polished or otherwise smoothed to the highest possible degree commensurate with the material and purpose at hand, in order to render it non-scattering.

Fig. 3 shows a single screen mirror element, in this instance a convex element $si$. The optical properties of the elements are for present purposes sufficiently described and determined by the axis $e$, ordinarily but not necessarily parallel to system axis $z$, radius $r$, object field angle $a/2$, and image field angle $a'/2$. As well known, these values determine, together with a given object and observer, the stops and entrance and exit pupils and windows respectively; these again determine the field covered by the optical element in terms of $a/2$, and the emerging rays in terms of $a'/2$. For purposes of the invention as embodied in the examples given hereinbelow, the angle $a'$ is quite large and its definite value immaterial, so that only angle $a$ is indicated in Fig. 1.

Since the dimensions of the mirror elements can be freely selected within the psychophysiological limitations to be referred to below, the mirror element configuration as a whole can be fitted to the given field or fields of observation. Thus, an optimum amount of light energy available can be directed and spread into the field of observation, so to speak from the object (in this case the diapositive), and concentrated therein with minimum loss and therefore optimum brilliance of the elementary image as perceived by the observer within the field of observation. Furthermore, any light from a source outside the field of observation is deviated into space outside that field, so that it cannot interfere with the projected image. If this outside light is coming from outside of and undesirable in the field of observation, such as direct or indirect artificial or daylight, the contrast of the object such as a diapositive will be preserved and indeed improved as compared to that obtainable with conventional screens which do not reject such extraneous light and therefore often obliterate the image by lowering the contrast to physiologically undesirable degree. If the outside light is operatively desirable such as that of a second projector, the two (or if desired more) fields of observation can be kept apart. This latter embodiment of the invention will be described more in detail hereinbelow.

For purposes of the present example with considerable distance between screen and projector, it can be assumed that the mirror axes are parallel; it will be understood however that, for more nearly equal object and image distances from the imaging system, the mirror configuration can be determined for inclined mirror axes and non-parallel incident pencils, in accordance with well known principles.

Possible differences in average image distance of convex and concave elements respectively, are of second order importance especially in view of the fact that the images extend axially, so that they are for practical purposes within a plane formed by the mirror boundaries.

The elementary images are subject to considerable aberration but the mirror elements are designed to furnish images which are as concentrated as possible. This does not necessarily mean that they must be small in all dimensions, but they are designed in accordance with the principles of reflecting surfaces to furnish optimum brilliance. This brilliance is considerably higher than than of extraneous light which might be reflected into the field of observation by unavoidable irregular or uncontrollable regions of the reflecting screen. This brilliance is further higher than that of light which usually might originate in the field of observation.

The distorted real or virtual elementary images can be considered to constitute light sources which are as to intensity and color modulated by the corresponding object element. The mirror profiles need not be perfect so long as they are highly polished and have the above-mentioned field properties; aberration is favorable for averaging the detail of the object element. I observed that small but high intensity images fuse as well as larger less intense images at similar separations.

The peculiar choice of elementary image configuration and spacing is based, in accordance with the invention, on the concept not to attempt matching or registering of the border regions of comparatively undistorted elementary images, but to provide small image points which are highly concentrated transversely of the respective mirror element even so as to act as comparatively intense sources of light modulated as to wave length and amplitude by the object, such as a transparency in a projector. It is thus not the regularity of the elementary images which controls essentially continuous and well defined presentation of the entire image, but the effective separation and brilliance relation of the elementary point images. Such fusion is governed by different psychophysiological principles than those applying to the matching of adjacent low intensity patterns. It was found that in accordance with this principle, the elementary systems can be larger than it was heretofore supposed to be feasible, with the ensuing mechanical advantages including those of ease of manufacture, possibility of higher polish, and possibility of better control of shape. Since according to this concept the pattern of each individual image point is irrelevant and therefore aberration and distortion is beneficial rather than detrimental, the optical elements can be shaped and surfaced purely with a view to providing a maximum energy output into the field of observation, by judicious choice of surface properties and object and image field angles together with field stop defining boundaries or rims.

Figure 4:
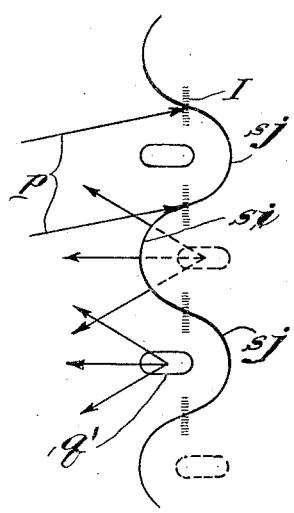
Fig. 4 is a diagrammatic cross section through several elementary optical elements of a screen according to the invention, illustrating its performance with regard to the formation of elementary images and of the presentation of these images.

The above characteristic features are illustrated in Fig. 4 which shows several elementary mirrors $s$, with transversely concentrated real and virtual images $q'$ extending axially, a ray pencil $p$, and a plane I through the boundary regions of the elementary mirrors.

Figures 5, 6:
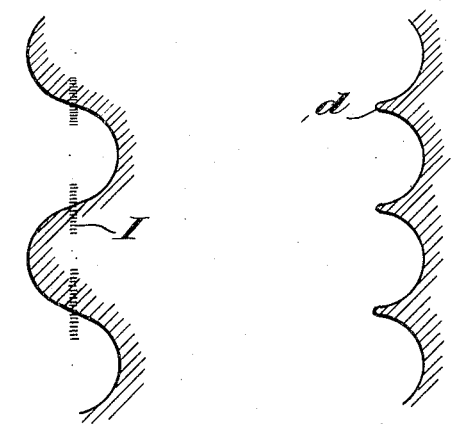
Figs. 5 and 6 are diagrams illustrating undesirable dead areas.

Referring to Figs. 5 and 6, it will be observed that screens according to that aspect of the invention which contemplates alternatingly concave and convex surfaces are particularly free of uncontrollabl areas. Comparing Figs. 5 and 6, the former showing a concave-convex undulated surface and the latter a purely concave surface, it will be noted that the section according to Fig. 5 does not have surface areas which cannot be predetermined and controlled in accordance with the principles of the invention. Such areas are unavoidable in any manufacturing technique if ridges or recesses are part of the surface configuration, and they may reflect undesirable light into the field of observation.

In view of the above, it will be noted that screens according to Figs. 10 to 12 are particularly free of uncontrollable areas, which might accumulate dust as those of Figs. 7 to 9, whereas, although the shape according to Figs. 13 to 15 is excellent in that respect, it contains small areas marked $u$ which do not conform to a predeterminable optically determinable shape, being thus uncontrollable.

At any rate it will now be evident that comparatively little detrimental light is reflected into a chosen field of observation so that, as initially stated, a screen composed of mirror elements according to the invention reflects such detrimental light into the field of observation essentially only at intensities which are at any one point of that field lower than the intensity of the image.

The optimum mirror element configuration for a given purpose can be easily arrived in accordance with the principles of the invention at either theoretically as indicated above, or empirically. The following practical embodiments have given the satisfactory performance indicated in connection therewith.

The screen shown in Figs. 7 to 9 has the following dimensions indicated in these figures.

$r1 = 0.055''$
$r2 = 0.030''$
$d1 = 0.120''$
$d2 = 0.077''$
$d3 = 0.043''$
$h1 = 0.015''$
$h2 = 0.010''$
$g1 = 0275''$

A screen constructed according to Figs. 7 to 9, 22" wide and 19" high, placed at a distance of 14 feet from a standard 35 mm., 500 watt projector, with the projector approximately normal to the screen, is determined by a field of observation having the following approximate dimensions indicated in Fig. 1.

$$m1 = 11 \text{ feet}$$
$$m2 = 15 \text{ inches}$$
$$\text{angle } ah = 107.2°$$
$$\text{angle } av = 8.2°$$

It will be understood that the front edge distance of the field of observation is approximate and that the practically usable field begins at a greater distance from the screen. Needless to say the field extends in the rear theoretically into infinity and is practically limited in that direction by architectural or other considerations.

With as many as ten flood lights with reflectors of 500 watts each, shining directly on the screen, placed in a solid bank at 3 feet horizontal distance from the screen and 3 feet vertical distance from the projector axis, with the screen according to Figs. 7 to 9 receiving an image from the above projector, an image of excellent contrast was obtained on the screen according to Figs. 7 to 9, whereas the image on a conventional beaded screen, was extinguished by excess illumination received from the floodlights. The following comparative values in foot candles indicate the respective performances, these values having been measured in the projector axis, at distances $m3$, etc., corresponding to and in the same direction as distances $m1$ and $m2$ of Fig. 1.

*Projector and extraneous sources effective*

| Distance | $m3$ | $m4$ | $m5$ | $m6$ |
|---|---|---|---|---|
| Feet | 14 | 15 | 16 | 17 |
| FC Figs. 7-9 | 0.90 | 0.85 | 0.80 | 0.75 |
| FC Beaded | 4.20 | 3.65 | 3.40 | 3.20 |

Unmodulated light from the projector alone without film was measured at 52 FC at the center of the screen. These values are essentially the same in lateral points at the above distances, close to the borders of the object field as shown in Fig. 1, with abrupt decrease of image contrast beyond these borders.

This test is confirmed by the following readings taken at the same points but with the flood lights extinguished and the projector in operation as before. This test also indicates the improved efficiency of screens according to the invention, apart from the rejection of detrimental extraneous illumination.

*Projector alone effective*

| Distance | $m3$ | $m4$ | $m5$ | $m6$ |
|---|---|---|---|---|
| Feet | 14 | 15 | 16 | 17 |
| FC Figs. 7-9 | 0.90 | 0.85 | 0.80 | 0.75 |
| FC Beaded | 0.60 | 0.55 | 0.50 | 0.45 |

The beneficial effect of screens according to the invention is still further illustrateed by a test during which the screens used for the above tests, were in the same setup and environment, affected by the flood lights only, with the projector turned off. The flood light intensity measured at 500 FC at the center of the screens. Under these conditions, the light reflected from the screen according to the invention was measured 0.5 FC at 1 foot from the screen while the beaded screen measured at 150 FC at the same point.

The embodiments according to Figs. 10 to 12 and 13 to 15 respectively have both convex and concave reflector elements.

The screen shown in Figs. 10 to 12 has the same dimensions as those indicated in Figs. 7 to 9 with the difference that negative and positive values of $r1$ and $r2$ alternate and that the values $h1$ and $h2$ are similarly positive and negative measured in either direction from the zero contour line which takes the place of the recess line of Fig. 7.

The above referred to field stop defining boundaries or aperture rims of the optical elements are indicated at $A1$ and $A2$ of Figures 7 to 12, $A1$ denoting the horizontal, and $A2$ the vertical series of such lines.

The screen indicated in Figs. 13 to 15 has the following dimensions indicated in these figures:

$$r3,4 = \pm .038''$$
$$r5,6 = \pm .265''$$
$$d4 = .050''$$
$$g2 = .100''$$

This embodiment is constructed for operation with a field of observation required to have an angle $av$ of approximately 30° and an angle $ah$ of approximately 100°, these angles being indicated in Fig. 1. By varying the radii in Fig. 13 it is easily possible to construct the embodiment of Fig. 13 to comply with any desired field of observation and the pattern therefor does not confine itself to specifically these field dimensions.

The above screens are made with substantially non-scattering surfaces of brass, polished to mirror smoothness, and if desired, chromium or nickel plated depending upon requirements of color selectivity. It was found that the highly polished brass surface is satisfactory for many purposes.

Screens of the above type can be manufactured in various ways. Some shapes can be milled by conventional shop methods. Others, such as that according to Figs. 7 to 9, are preferably made as follows. A master model is first made by hand or machine, to a scale large enough to permit fairly exact incorporation of the predetermined curvatures. This model is then reduced to actual scale by copying on a three dimensional engraving machine of conventional design employing the pantograph principle, in material suitable for use of the actual scale copy as a matrix. The screens are then pressed from the matrix according to conventional practice. Such a surface has been engraved into a knurling tool and such surfaces can be knurled into rolls, or engraved into rolls, creating, by conventional methods, a male and female pair through which sheet material can be rolled.

Referring now to that aspect of the invention which contemplates presentation of useful light from more than one object region, such as projection of two transparencies to be viewed from two separate fields of observation, a practical embodiment of this aspect will now be described with reference to Fig. 16.

Fig. 16 represents in essence a median section on axes $y$—$z$ of Fig. 1, but with three projectors P1, P2, P3, three corresponding fields of observation O1, O2, O3 and field angles $a1$, $a2$, $a3$. The arrangement and correlation of P1 and O1 can be exactly as described with reference to Fig. 1. Similar projectors P2 and P3 are added, having fields of observation O2 and O3. It will be noted that field O2 is in the region of projector P3 whereas O3 is in the region of P2. Fig. 16 assumes symmetry of all three elements, but it will be evident that dissymmetries can be introduced by modifying the corresponding optical characteristics. It will also be understood that while Fig. 16 indicates three projectors arranged in a horizontal plane, they can be arranged above each other.

In accordance with the above explained principles, it will now be evident, without detailed description, that the light from projectors P2 and P3 is extraneous so far as O1 is concerned and will not reach O1. Similarly, light from projector P2 will be imaged into O2 but not into O1 and O3, and light from projector P3 will be imaged into O3 but not into O1 and O2.

Needless to say, the border regions are not absolutely sharp. These regions are indicated at O12 and O13 and at these the images of P1, P2 and P1, P3 will to a certain degree overlap. If the angles $k$ are relatively large, there will be overlap of the fields of observation whereas, if they are relatively small, gaps occur between the fields.

Various practical embodiments of this principle are possible.

For example, if only two projectors P1 and P2 are arranged vertically above each other, extraneous light from O3 will be excluded from O1 and O3, whereas the transparencies of P1 and P2 will be presented within O1 and O2. Thus two different pictures can be shown to balcony O3 and main floor O1, while illumination from a skylight is excluded from both O1 and O3.

As another example, one area, such as O2, can be provided with a projected picture from P2 while an area O3 can be provided with general illumination from a light source replacing P3.

In an actual setup of this type, with three projectors, one above the other within a vertical plane $y$—$z$ projecting three different images onto a screen made according to Figs. 10 to 13, the following values provided essentially perfect image separation:

$$rp = 15 \text{ feet}$$
$$k = 8.2°$$

It will now be apparent that, due to the highest attainable polish and the peculiar configuration and spatial relation of the optical elements forming screens according to the invention, uncontrollably reflecting or diffusing or light absorbing areas are for practical purposes eliminated, thus providing optimum brilliance of the elementary images which, likewise according to the invention, constitute elementary light sources at separations which are just sufficient to cause perceptual fusion of these images, and hence are comparatively large. As previously mentioned, no attempt is made to reproduce the patterns of the object elements $q$ in the images $q'$ which merely represent the color and average intensity values of the original element. Thus the screen element curvatures can be determined regardless of aberration and distortion, but rather with emphasis on field angles and minimum loss of light energy. The closely joined, continuously undulated surfaces acording to the invention essentially comply with these requirements.

It should be understood that the present disclosure is for the purpose of illustration only and that this invention includes all modifications and equivalents which fall within the scope of the appended claims.

What is claimed is:

1. An optical screen for presenting to a field of observation the image of an object region projected on said screen, comprising an essentially corrugated surface, each corrugation being modified to provide a curvature undulating from concave to convex in a direction lengthwise of the corrugations in a plane perpendicular to the plane of the screen, the concave and convex undulation having a greater radius of curvature than the radius of curvature of the corrugations, providing a highly directional imaging surface composed of a plurality of elementary optical surfaces each having a rim curvature and imaging cross sectional curvatures, said elementary optical surfaces being arranged in rows with undulating contours continuously varying through series of intersecting cross sections and being substantially contiguously and continuously joined at said rims which joined rims form two intersecting series of continuously curved aperture lines one of which series lies in a plane that is essentially parallel to a plane tangential to said contours, whereby the joining surface areas are at said aperture lines essentially optically wholly controllable so that the highly directional screen presents said image to said field of observation with optimum intensity.

2. Screen according to claim 1, wherein said elementary optical surfaces are alternately convex and concave and merge to form a continuously undulated screen surface.

3. An optical screen for presenting to a field of observation the image of an object region projected on said screen, comprising an essentially corrugated surface, each corrugation being modified to provide a curvature undulating from concave to convex in a direction lengthwise of the corrugations in a plane perpendicular to the plane of the screen, the concave and convex undulation having a greater radius of curvature than the radius of curvature of the corrugations, providing a highly directional imaging surface composed of a plurality of elementary optical surfaces each having a rim curvature and imaging cross sectional curvatures for conjointly producing elementary stops and image fields of corresponding configurations, said elementary optical surfaces being arranged in rows with contours continuously varying through series of intersecting cross sections and being substantially contiguously and continuously joined at said rims which joined rims form continuously curved aperture lines, whereby each elementary surface presents to its image field an elementary image of optimum intensity, which image fields can be determined by selection of said rim and imaging curvatures to conform to a predetermined field of observation.

4. An optical screen for presenting to a field of observation the image of an object region projected on said screen, comprising an essentially corrugated surface, each corrugation being modified to provide a curvature undulating from concave to convex in a direction lengthwise of the corrugations in a plane perpendicular to the plane of the screen, the concave and convex undulation having a greater radius of curvature than the radius of curvature of the corrugations, providing a highly directional imaging surface composed of a plurality of elementary optical surfaces each having a rim curvature and imaging cross sectional curvatures for conjointly producing rectangular elementary stops and image fields, said elementary optical surfaces being arranged in staggered rows with alternatingly convex and concave contours continuously varying through series of cross sections at right angles to each other and being substantially contiguously and continuously joined at said rims which joined rims form two rectangularly intersecting series of continuously curved aperture lines one of which series lies in a plane that is essentially parallel to a plane tangential to said contours, whereby the joining surface areas at said aperture lines are essentially optically wholly controllable, and each elementary surface presents to its image field an elementary image of optimum intensity, which image fields can be made rectangular by selection of said rim and imaging curvatures to conform to a rectangular field of observation.

5. An optical screen for presenting to a field of observation the image of an object region projected on said screen, comprising an essentially corrugated surface, each corrugation being modified to provide a curvature undulating from concave to convex in a direction lengthwise of the corrugations in a plane perpendicular to the plane of the screen, the concave and convex undulation having a greater radius of curvature than the radius of curvature of the corrugations, providing a highly directional reflective imaging surface composed of a plurality of elementary curved mirrors each having a rim curvature and imaging cross sectional curvatures for conjointly producing elementary stops and image fields of corresponding configurations, said elementary mirrors being arranged in rows with undulating contours continuously varying through series of intersecting cross sections, and being substantially contiguously and continuously joined at said rims which joined rims form two intersecting series of continuously curved aperture lines one of which series lies in a plane that is essentially parallel to a plane tangential to said contours, whereby the joining surface areas at said aperture lines are essentially optically wholly controllable, and each elementary mirror presents to its image field an elementary image of optimum intensity, which image fields can be determined by selection of said rim and imaging curvatures to conform to a predetermined field of observation.

6. A screen according to claim 5 whrein said elementary mirrors are elongate with an approximately 2.75 to 1.2 ratio of the maximum dimension to the minimum dimension.

7. A screen according to claim 6 wherein said maximum dimension is in the order of magnitude of 0.275 inches.

8. Screen according to claim 5 wherein said imaging curvatures have alternate approximate apex radii of 0.03 inches and 0.055 inches respectively.

9. A screen according to claim 5 wherein said rows are staggered with said continuously curved aperture lines forming an essentially linear pattern of minimal length.

10. An optical screen for presenting to a field of observation the image of an object region projected on said screen, comprising an essentially corrugated surface, each corrugation being modified to provide a curvature undulating from concave to convex in a direction lengthwise of the corrugations in a plane perpendicular to the plane of the screen, the concave and convex undulation having a greater radius of curvature than the radius of curvature of the corrugations, providing a highly directional reflective imaging surface composed of a plurality of elementary curved mirrors each having a rim curvature and imaging cross sectional curvatures for conjointly producing rectangular elementary stops and image fields of corresponding configurations, said elementary mirrors being arranged in staggered rows with alternatingly convex and concave contours continuously varying through consecutive series of intersecting parallel cross sections, and being substantially contiguously and continuously joined at said rims which joined rims form two intersecting series of continuously curved aperture lines one of which series lies in a plane that is essentially parallel to a plane tangential to said contours, whereby the joining surface areas at said aperture lines are essentially optically wholly controllable, and each elementary mirror presents to its image field an elementary image of optimum intensity, which image fields can be made rectangular by selection of said rim and imaging curvatures to conform to a rectangular field of observation.

11. An optical screen for presenting to a field of observation the image of an object region projected on said screen, comprising an essentially corrugated surface, each corrugation being modified to provide a curvature undulating from concave to convex in a directional lengthwise of the corrugations in a plane perpendicular to the plane of the screen, the concave and convex undulation having a greater radius of curvature than the radius of curvature of the corrugations, providing a highly directional reflective imaging surface composed of a plurality of elementary curved mirrors each having a rim curvature and imaging cross sectional curvatures for conjointly producing rectangular elementary stops and image fields of corresponding configurations, said elementary mirrors being arranged in staggered rows with alternatingly convex and concave circular contours continuously varying through consecutive series of intersecting parallel cross sections, and said elementary mirrors being substantially contiguously and continuously joined at said rims which joined rims form two intersecting series of continuously curved aperture lines one of which series lies in a plane that is essentially parallel to a plane tangential to said contours, whereby the joining surface areas at said aperture lines are essentially optically wholly controllable, and each elementary mirror presents to its image field an elementary image of optimum intensity, which image fields can be determined by selection of said rim and imaging curvatures to conform to a predetermined field of observation.

12. A projection screen for optimum utilization by reflection of light impinging thereon, comprising an essentially corrugated surface, each corrugation being modified to provide a curvature undulating from concave to convex in a direction lengthwise of the corrugations in a plane perpendicular to the plane of the screen, the concave and convex undulation having a greater radius of curvature than the radius of curvature of the corrugations, providing a plurality of optical elements which together constitute a highly directional imaging surface, said optical elements having the form of concavities and convexities such that the boundaries between adjacent elements formed by the points of curvature change from one element to the next and constitute two intersecting series of lines all of which are continuously curved, one series lying in planes which intersect each other in lines that are parallel to the imaging surface as a whole and the other series lying in planes which intersect each other in parallel lines that are parallel to the imaging surface as a whole and oblique to said intersection lines of said first series whereby said surface is essentially wholly directional and image forming without flat, scattering and absorbing areas, and said lines constitute the aperture boundaries of each one of said elements.

13. Screen according to claim 12 wherein each of said concavities and convexities is curved in relation to its boundaries such that the viewing zone in which the projected image becomes visible is of rectangular configuration.

14. Screen according to claim 12 wherein said planes of said first series of lines coincide such as to constitute a single plane that is essentially parallel to the imaging surface as a whole, and said planes of said second series of lines are parallel and intersect said imaging surface as a whole at substantially right angles.

References Cited in the file of this patent

UNITED STATES PATENTS

| | | |
|---|---|---|
| 938,729 | Voege | Nov. 2, 1909 |
| 1,535,985 | Clark | Apr. 28, 1925 |
| 1,550,880 | Clark | Aug. 25, 1925 |
| 1,852,858 | Raven | Apr. 5, 1932 |
| 1,935,220 | Wildhaber | Nov. 14, 1933 |
| 1,985,460 | Raven | Dec. 25, 1934 |
| 1,995,964 | Darimont | Mar. 26, 1935 |
| 2,044,620 | Matthai | June 16, 1936 |
| 2,075,853 | Kanolt | Apr. 6, 1937 |
| 2,086,556 | Jacobson | July 13, 1937 |
| 2,381,614 | Moller et al. | Aug. 7, 1945 |
| 2,480,031 | Kellogg | Aug. 23, 1949 |
| 2,552,455 | Pond | May 8, 1951 |
| 2,627,200 | Huber | Feb. 3, 1953 |